No. 886,872. PATENTED MAY 5, 1908.
J. SANDERS.
THRESHING MACHINE.
APPLICATION FILED MAY 29, 1906.

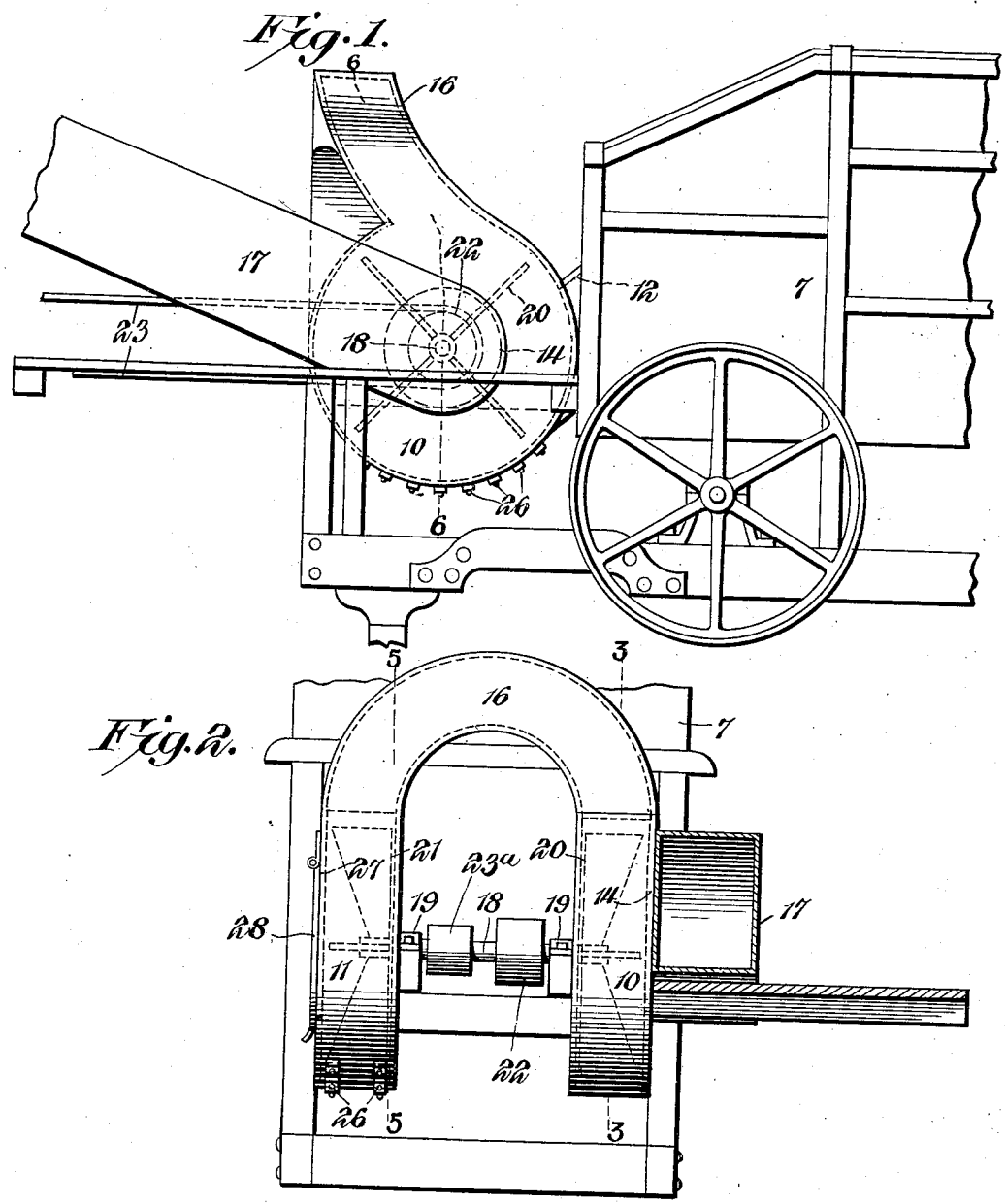

2 SHEETS—SHEET 2.

John Sanders, Inventor,

Witnesses
Howard D. Orr.
B. F. Foster.

By E. G. Siggers
Attorney

UNITED STATES PATENT OFFICE.

JOHN SANDERS, OF DUNDEE, TEXAS.

THRESHING-MACHINE.

No. 886,872.        Specification of Letters Patent.        Patented May 5, 1908.

Application filed May 29, 1906. Serial No. 319,316.

*To all whom it may concern:*

Be it known that I, JOHN SANDERS, a citizen of the United States, residing at Dundee, in the county of Archer and State of Texas, have invented a new and useful Threshing-Machine, of which the following is a specification.

This invention relates more particularly to that class of threshing machines, in which fan mechanism is employed for threshing out the grain from the straw.

The principal object is to provide an exceedingly simple structure, which is very rapid and effective in operation, is light in weight, eliminates the necessity of the usual cylinder and beater, and reduces the friction on the bearings and the amount of power necessary to drive the machine.

An embodiment of the invention is illustrated in the accompanying drawings, wherein:—

Figure 3:
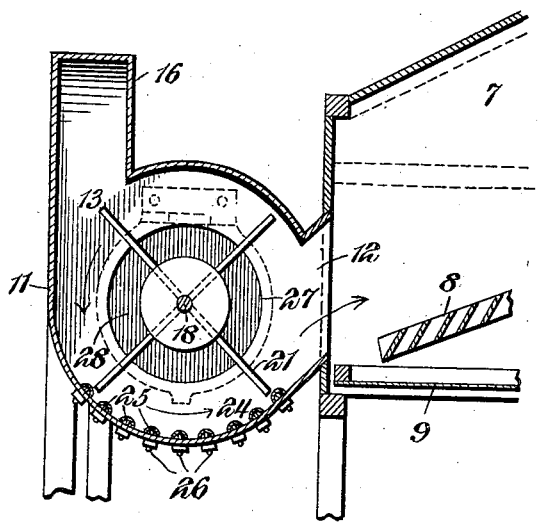
Figure 4:
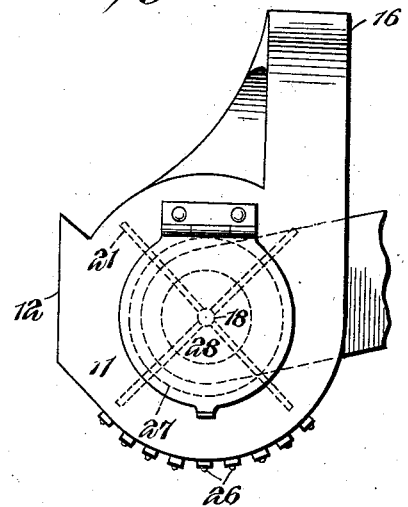
Figure 5:
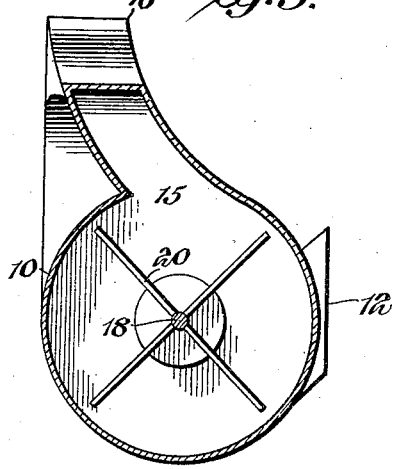
Figure 6:
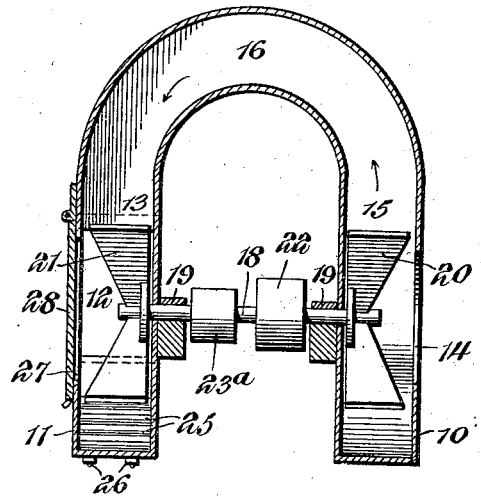

Figure 1 is a side elevation of a portion of a separator, showing the improved threshing mechanism applied thereto. Fig. 2 is an end elevation of the same, portions being shown in section. Fig. 3 is a vertical sectional view on the line 3—3 of Fig. 2. Fig. 4 is a side elevation of the threshing cylinder. Fig. 5 is a sectional view on the line 5—5 of Fig. 2. Fig. 6 is a cross sectional view on the line 6—6 of Fig. 1.

Similar reference numerals designate corresponding parts in all the figures of the drawings.

The separating mechanism may be of any well known character, the present improvement relating more particularly to the threshing mechanism and the feeding means therefor. This mechanism and feeding means may be applied to practically any of the well known separators, if desired. In order to fully show the application of the invention, a portion of a separator is illustrated, comprising a suitable frame or body 7, within which the separating mechanism is located, a portion of said mechanism being illustrated in Fig. 5, wherein the lower end of a straw carrier 8 is shown with a grain pan 9 located therebeneath.

Mounted on one end of the frame or body 7 are spaced fan casings 10 and 11. The fan casing 11 constitutes part of the threshing mechanism, and has a discharge throat 12 for directing the material rearwardly into the separating means. Said casing also has a peripheral inlet 13. The other casing has a central inlet opening 14 in its outer side, and a peripheral outlet 15. This outlet 15 is connected to the inlet 13 of the casing 11 by an upwardly arched spout or conveyer tube 16 that bridges the space between the casings, and is disposed transversely of the machine. A downwardly inclined grain-directing chute 17 communicates at its lower end with the inlet 14 of the casing 10. This chute receives the material from a band cutter and feeder (not shown), which may be of any suitable construction.

A shaft 18 extends across the space between the fan casings 10 and 11, and projects into said casings, said shaft being journaled in suitable bearings 19. The ends of the shaft, located within the casings, carry fans 20 and 21. A pulley 22, mounted on the shaft between the casings, is driven from any suitable source of power by a belt 23 passing about said pulley, and thus constitutes driving means for the shaft and fans. The separating mechanism may, if desired, be operated from another pulley 23$^a$, also mounted on the shaft between the casings.

The casing 11, as already stated, constitutes a part of the threshing mechanism. Within it is located a concave 24, having transverse ribs 25, secured in position by bolts 26. Access to the interior of the casing may be readily gained through an opening 27, formed in the outer side of said casing, and normally closed by a suitable door 28.

In operation, the grain to be threshed is directed by the chute 17 into the casing 10, where it is rapidly revolved by and delivered with the blast of air from the fan through the spout or conduit 16 into the threshing mechanism, the fan 20 thus constituting in effect, feeding mechanism for the latter. In this second casing, a further rapid rotation is given the straw and grain, which passes over the concave, so that the grain is thoroughly threshed out of the heads. From the threshing mechanism, the fan delivers the material into the separating mechanism.

Experience has demonstrated that this mechanism is highly effective for detaching the grain from the straw, and is moreover extremely rapid in operation. It is also very light in weight, and eliminates the necessity of the toothed cylinders and beaters. Moreover, with this structure, there is no dust at the front of the separator, the dust being carried off with the blast of air and delivered from the rear end of the separator, leaving condition. By hav-
...ion between the fans
is greatly reduced, and
...bly less power is neces-
...ng the machine than is required
... employing the ordinary toothed
...ers and concaves.

From the foregoing, it is thought that the construction, operation, and many advantages of the herein described invention, will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In a threshing machine, the combination with a separator body having separating mechanism therein, of threshing mechanism mounted on one end of the body and delivering to the separating mechanism, a fan casing located at said end of the separator body and having a spout delivering to the threshing mechanism, means located at said end of the body for delivering material to the casing, and a feed fan rotatably mounted in the casing for moving the material therethrough.

2. In a threshing machine, the combination with a separator body having separating mechanism therein, of threshing mechanism mounted on the body and including a casing having an inlet and an outlet delivering to the separating mechanism, a concave located in the casing, and a rotary member mounted in the casing and coacting with the concave, and means for feeding material to the threshing mechanism, said means comprising a casing having an inlet and an outlet, the latter communicating with the inlet of the threshing mechanism casing, means located at one end of the body for delivering material to the inlet, and a feeding fan operating in the feed casing.

3. In a threshing machine, the combination with a separator body having separating mechanism therein, of threshing mechanism delivering to the separating mechanism, a fan casing having an inlet and an outlet delivering to the threshing mechanism, a fan operating in the casing, and means located at one end of the separator body for delivering grain to be threshed to the inlet of the casing.

4. In a threshing machine, the combination with a separator body having separating mechanism therein, of threshing mechanism mounted on one end of the body, means for feeding grain thereto, said means comprising a fan casing located on said end of the body and having an inlet, an outlet conduit delivering from the casing to the threshing mechanism, a fan operating in the casing, and a grain conveying chute communicating with the inlet of the casing and located at said end of the body.

5. In a threshing machine, the combination with a separator body and separating mechanism therein, of threshing mechanism located at one end of the body and including a casing having an inlet and an outlet, the latter delivering to the separating mechanism, a fan operating in the casing, and pneumatic grain feeding means located at said end of the body and delivering to the casing.

6. In a threshing machine, the combination with a separator body and separating mechanism therein, of threshing mechanism including a casing having an inlet, and an outlet delivering to the separating mechanism, said threshing mechanism also including a fan operating in the casing, and pneumatic grain feeding mechanism comprising a casing having an inlet and an outlet, a fan operating in the casing, and a spout connecting the outlet of the feeding mechanism casing to the inlet of the threshing mechanism casing.

7. In a threshing machine, the combination with separating means, of threshing mechanism including a casing having an inlet, and an outlet delivering to the separating means, grain feeding mechanism comprising a casing having an inlet and an outlet, and a fan operating in the casing, a spout connecting the outlet of the feeding mechanism casing to the inlet of the threshing mechanism casing, and a chute communicating with the inlet of the feeding mechanism casing.

8. In mechanism of the class described, the combination with a supporting frame, of grain separating mechanism mounted therein, spaced fan casings mounted on one end of the frame and having inlets and outlets, one of said outlets delivering to the separating mechanism, a spout connecting the inlet of said casing with the outlet of the other casing, means for directing material to the inlet of said other casing, a concave located in the first mentioned casing, a shaft extending into the casings and across the space between the same, fans mounted on the shaft and located in the casings, and means connected to the shaft between the casings for driving said shaft.

9. In mechanism of the class described, the combination of the supporting frame and grain separating mechanism mounted therein, spaced fan casings mounted side by side on one end of the frame and having inlets and outlets, the outlet of one of said casings delivering to the separating mechanism, and said casing having a concave therein, a curved spout disposed transversely of the casings and bridging the space between them, said spout connecting the inlet of said casing with the outlet of the other casing, and fans mounted in the casings.

10. In mechanism of the class described, the combination with a supporting frame, and grain separating mechanism mounted therein, of fan casings mounted side by side at one end of the frame and delivering to the separating mechanism, a common shaft extending through the casings, fans mounted on said shaft within the casings, and a curved spout connecting the fan casings.

11. In a threshing machine, the combination with fan casings located side by side and having inlets and outlets, of fans located in the casings, a conduit connecting the outlet of one to the inlet of the other, feeding means associated with the inlet of the first, and separating mechanism associated with the outlet of the second.

12. In a threshing machine, the combination with spaced fan casings located side by side and having inlets and outlets, of a shaft extending between and into the casings, fans mounted on the shaft and located within the casings, driving means connected to the shaft between the casings, a conduit connecting the outlet of one casing to the inlet of the other, feeding means associated with the inlet of the first, and separating mechanism associated with the mechanism of the second.

13. In a threshing machine, the combination with a separator body, and separating mechanism therein, of spaced fan casings located side by side on one end of the body, a shaft extending across the space between the casings and into said casings, fans mounted on the shaft within the casings, said casing each having an inlet and an outlet, feeding means associated with the inlet of one casing, the outlet of the other casing delivering to the separating mechanism, and a conduit connecting the outlet of the first mentioned casing to the inlet of the second casing.

In testimony, that I claim the foregoing as my own, I have hereto affixed my signature in the presence of two witnesses.

JOHN SANDERS.

Witnesses:
   PETE RAYBORN,
   S. B. COBURN.